UNITED STATES PATENT OFFICE.

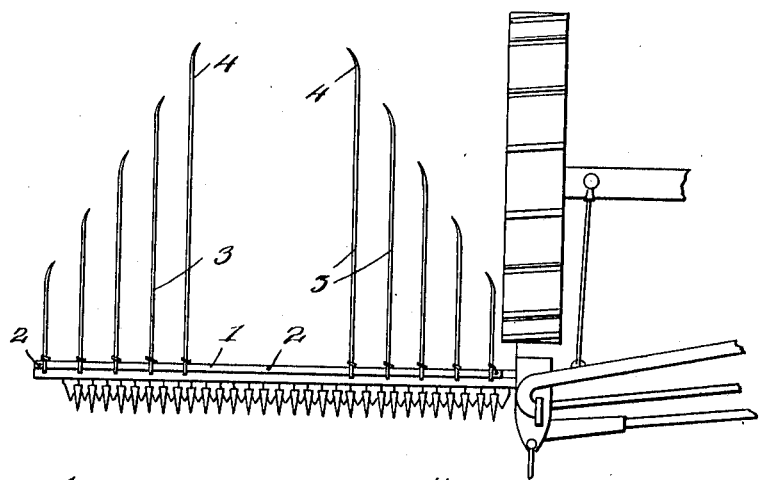
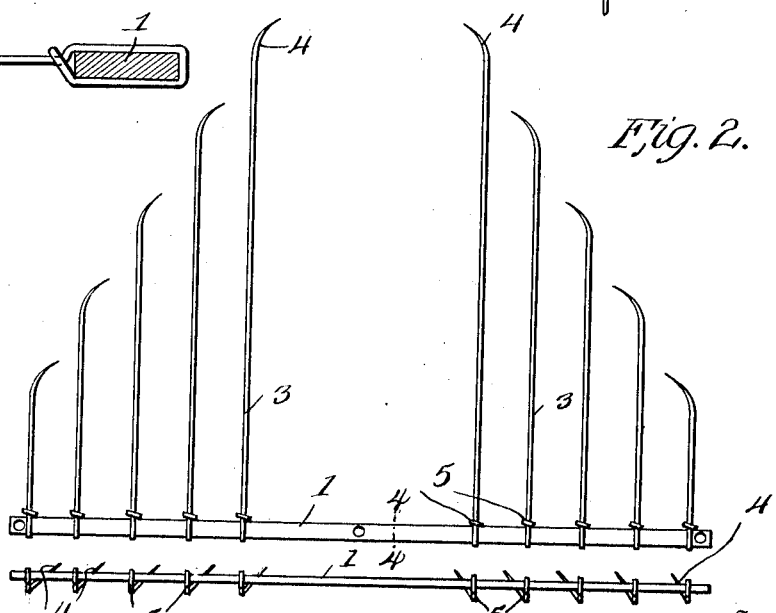

PHEBE A. EARLES, OF ROOSEVELT, OKLAHOMA.

WINDROW ATTACHMENT FOR MOWING-MACHINES.

1,020,810. Specification of Letters Patent. Patented Mar. 19, 1912.

Application filed December 27, 1910. Serial No. 599,331.

*To all whom it may concern:*

Be it known that I, PHEBE A. EARLES, a citizen of the United States of America, residing at Roosevelt, in the county of Kiowa and State of Oklahoma, have invented new and useful Improvements in Windrow Attachments for Mowing-Machines, of which the following is a specification.

This invention relates to mowing machines, and it has for its object to produce an attachment of simple and improved construction which, when applied to an ordinary mowing machine, will serve to displace cut grass, alfalfa or other crop material from the ends in the direction of the center of the swath, thus forming a windrow, and leaving the material under more advantageous conditions for curing than if permitted to drop where cut, and also saving the subsequent operation of dragging it into windrows and also protecting it from being tramped upon by the draft animals at the next passage of the machine, whereby in the case of crops for seed much loss is ordinarily experienced by the seeds being tramped or threshed out by the animals.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of the improved attachment showing the same applied to the sickle bar of a mowing machine. Fig. 2 is a top plan view of the device detached. Fig. 3 is a front view of the same. Fig. 4 is a sectional detail view taken on the line 4—4 in Fig. 3.

Corresponding parts in the several figures are denoted by like characters of reference.

The improved device consists of a bar 1 which may be of the length of an ordinary sickle bar upon which it may be detachably mounted by fastening means of any description, such as clamps, bolts, screws or the like, as shown at 2. The bar 1 is provided adjacent to the ends thereof with rearwardly extending arms 3, 3 which may be formed of steel or other resilient wire, said arms being relatively short at the ends of the bar and of increasing length as they approach the middle of the bar. The arms 3 are substantially straight for the greater portion of their lengths, but they are provided at their rear ends, which are adapted to drag upon the ground with upturned teeth 4 which extend obliquely in an inward direction, that is to say, in the direction of the space in rear of the middle portion of the bar 1 which is not occupied by the rearwardly extending arms 3.

The bar 1 is of rectangular cross section, and the arms 3, 3 are provided at their rear ends with eyes or coils twisted about the bar, as shown at 5, said eyes conforming to the rectangular conformation of the bar whereby the arms will be securely retained in position. Any desired number of toothed arms may be used at each end of the bar, and said arms may be placed as closely together as may be desired.

In the operation of this invention, the bar 1 is mounted upon the sickle bar of the mowing machine, and the arms 3 drag upon the ground. The material cut by the latter will fall rearwardly over the sickle bar in the usual manner, but a portion of said material will fall upon the arms 3, 3 which extend rearwardly at the two sides of the swath, so that only a portion of the cut material will fall directly upon the ground between the two sets of arms that extend rearwardly at the ends of the sickle bar. The material that falls upon the arms 3, 3 will, as the machine progresses, be displaced in an inward direction by the teeth 4, and the cut material will thus be left in the form of a windrow, the width of which will be determined by the distance between the two sets of arms at the two ends of the sickle bar. The crop will thus be left in superior condition for curing and for subsequent gathering and in a position which during a subsequent passage of the machine will protect it from the hoofs of the draft animals.

Having thus described the invention, what is claimed as new, is:—

1. A windrow attachment for mowing machines consisting of a straight bar of rectangular cross section, a plurality of drag arms connected therewith, said drag arms consisting of substantially straight rods provided at their front ends with loops twisted around and engaging the bar, and said arms provided at their rear ends with terminal upturned obliquely disposed teeth.

2. A windrow attachment for mowing machines consisting of a bar of rectangular cross section adapted to be connected with the sickle bar, and two sets of rearwardly extending substantially straight drag arms so placed as to form a space between the sets, said sets being secured respectively adjacent to the ends of said bar, said arms being provided at their front ends with loops twisted around the rectangular bar and thereby held against vertical displacement, and said arms being provided at their rear ends with upturned obliquely disposed teeth extending inwardly in the direction of the space intermediate the two sets of arms.

In testimony whereof I affix my signature in presence of two witnesses.

PHEBE A. EARLES.

Witnesses:
B. J. JESTER,
L. O. SNELL.

Copies of this patent may be obtained for five cents each, by addressing the "Commissioner of Patents, Washington, D. C."